United States Patent
Fox

(10) Patent No.: US 6,764,065 B2
(45) Date of Patent: Jul. 20, 2004

(54) TRAILER JACK ASSISTANCE APPARATUS

(76) Inventor: Randy A. Fox, 3504 Lobetti Rd., Knoxville, TN (US) 37931

( * ) Notice: Subject to any disclaimer, the term of this patent is extended or adjusted under 35 U.S.C. 154(b) by 172 days.

(21) Appl. No.: 09/992,747

(22) Filed: Nov. 16, 2001

(65) Prior Publication Data

US 2003/0094801 A1 May 22, 2003

(51) Int. Cl.[7] .................................................. B60S 9/02
(52) U.S. Cl. ..................... 254/420; 254/103; 254/97; 254/419; 280/475; 280/763.1
(58) Field of Search .................................. 254/420, 419, 254/97, 103, 422, 424; 280/475, 763.1, 765.1, 427, 431, 477, 478.1, 479.2, 467

(56) References Cited

U.S. PATENT DOCUMENTS

| 4,238,113 A | 12/1980 | Adams |
| 4,796,864 A | 1/1989 | Wilson |
| 4,978,104 A | 12/1990 | Gipson, Jr. |
| 5,054,805 A | 10/1991 | Hungerink et al. |
| 5,125,679 A | 6/1992 | Delano |
| 5,340,143 A | 8/1994 | Williams, Jr. |
| 5,509,687 A | 4/1996 | Thondike |
| 5,755,430 A | 5/1998 | Couch |
| 5,931,500 A | 8/1999 | Dagnese |

Primary Examiner—Lee D. Wilson
(74) Attorney, Agent, or Firm—Pitts & Brittian P.C.

(57) ABSTRACT

An apparatus for assisting in the operation of a conventional trailer jack. The jack assistance apparatus is attached to a conventional trailer jack having telescoping tubes with a coarse adjustment and a fine adjustment. The apparatus includes a lever arm that engages a locking pin handle on the jack, and a guide tube that contains a chain or other flexible member with one end attached to the jack base and the other attached to a handle. The lever arm and handle are located for convenient access by an operator for coarse vertical adjustment of the jack.

14 Claims, 5 Drawing Sheets

TRAILER JACK ASSISTANCE APPARATUS

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of Invention

This invention pertains to jacking or lifting devices for use with trailers. More particularly, this invention pertains to an apparatus that locates the operator controls at a more convenient height for operation of a conventional lifting jack and thereby assists in the operation of the jack.

2. Description of the Related Art

Generally, lifting jacks are made in many different types and sizes, ranging from small jacking devices used for leveling and supporting work on wood planers to powerful hydraulic jacks capable of lifting a locomotive or even greater weights. The mechanisms used in the different types of jacks also vary greatly, with one of the more popular types consisting of a lifting screw which is inserted in a suitable base.

A common conventional jacking device for use with trailers, automobiles, trucks, campers, and the like includes a vertical member having a base for supporting the jack and an engaging member somehow mounted on the vertical member which may be either attached to, or positioned under the object to be lifted. The engaging member is moved upwardly along the vertical member by way of whatever jacking mechanism is selected, thereby lifting the object. For example, in order to lift the hitching end of a trailer, which is to be attached to a vehicle, the engaging member is fixed to the trailer frame near the hitch, and the engaging member is moved vertically with respect to the vertical member by means of a continuous screw mechanism.

To aid in the use of jacking devices, it is known in the art to have two means of vertical adjustment. A coarse vertical adjustment is used with no load on the jack to bring the base close to the ground. A fine vertical adjustment is used under full load to have the base fully engage the ground surface and to lift the object away from the ground. The use of both a coarse and fine adjustment does away with the need for having to lower or raise the jack by way of a single, slow operating, and continuous jacking mechanism.

One jacking device used with trailers is the type taught in U.S. Pat. No. 4,238,113, entitled "Jacking Device," issued to Adams on Dec. 9, 1980. Adams discloses a jacking device for attaching to a vehicle or trailer that has a coarse and fine vertical adjustment. The device of the Adams patent has a telescoping member with a screw mechanism for making fine height adjustments under load and a mounting column for making rough height adjustments in an unloaded state.

Typical of one of the jacking devices currently used with many trailers is the type taught in U.S. Pat. No. 4,796,864, entitled "Spring Loaded Drop Foot Trailer Jack," issued to Wilson on Jan. 10, 1989. The device disclosed in the Wilson patent includes telescoping tubular members that are adjusted vertically by aligning a locking pin between two members for coarse vertical adjustment under no-load conditions and by rotating a screw mechanism for fine vertical adjustment under load. The jack is deployed by allowing one member to drop to a position near the ground, at which point the locking pin is engaged. The screw mechanism is then used to telescope the members such that the lower member contacts the ground and the member attached to the vehicle is lifted away from the ground. Additionally, the Wilson patent claims a means for retracting the member used for coarse adjustment.

Variations of the above type of jack include that disclosed in U.S. Pat. No. 4,978,104, entitled "Quick Release Jack," issued to Gipson, Jr., on Dec. 18, 1990. The jack disclosed in the Gipson patent uses a rack and pinion assembly for vertical adjustment. Coarse vertical alignment of the jack is achieved by disengaging the drive gear from the vertical member, thereby allowing it to travel freely. U.S. Pat. No. 5,755,430, entitled "Trailer Jack Leveling Adapter," issued to Couch on May 26, 1998, discloses a jacking device that has a base with a vertical threaded member extending from it. The threaded member engages a threaded receptor mounted on one of two telescoping tubes. The tubes are fixed in an extended position by a locking pin inserted through aligned holes in the tubes. Operation of this device requires access to the base, which is in contact with the ground.

BRIEF SUMMARY OF THE INVENTION

According to one embodiment of the present invention, a jack assistance apparatus is provided. The jack assistance apparatus allows convenient access to the operator controls of a conventional jack, permitting the jack foot to be lifted without requiring the operator to bend over and grasp the jack foot as it sits on the ground. A lever arm and guide tube is attached to a conventional jack. The conventional jack includes telescoping tubes that have a locking pin for coarse adjustment and a screw mechanism for fine adjustment. The lever arm engages the jack's locking pin handle and is used to operate the locking pin. The guide tube contains a chain, one end of which is attached to the base and other attached to a ring or other type of handle. When the lever arm operates the locking pin to disengage the telescoping members of the jack, the chain runs free and permits the jack base to drop to the ground, at which time the lever arm operates the locking pin to lock the telescoping members in a fixed vertical position. To lift the base from the ground, the lever arm operates the locking pin to disengage the telescoping members, and a pulling force on the ring or handle causes the chain to transmit a lifting force to the base, which is locked in a raised position by the lever arm operating the locking pin to lock the telescoping members.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

An apparatus for assisting in the operation of a conventional trailer jack is disclosed. The jack assistance apparatus is generally illustrated in the figures as 10. The illustrated embodiment of the jack assistance apparatus allows convenient access to the operator controls of a conventional jack by allowing the jack foot 118 to be raised without requiring the operator to bend over and lift the jack foot as it sits on the ground. Also, the jack pin 120 can be operated at an elevated position by a lever arm 152. Those skilled in the art will recognize that, although the jack assistance apparatus 10 is described as being adapted to fit a conventional trailer jack, the jack assistance apparatus 10 can be adapted to fit any type of jack that has controls similar to those illustrated in FIG. 1 and described below without departing from the scope and spirit of the present invention.

Figure 1:
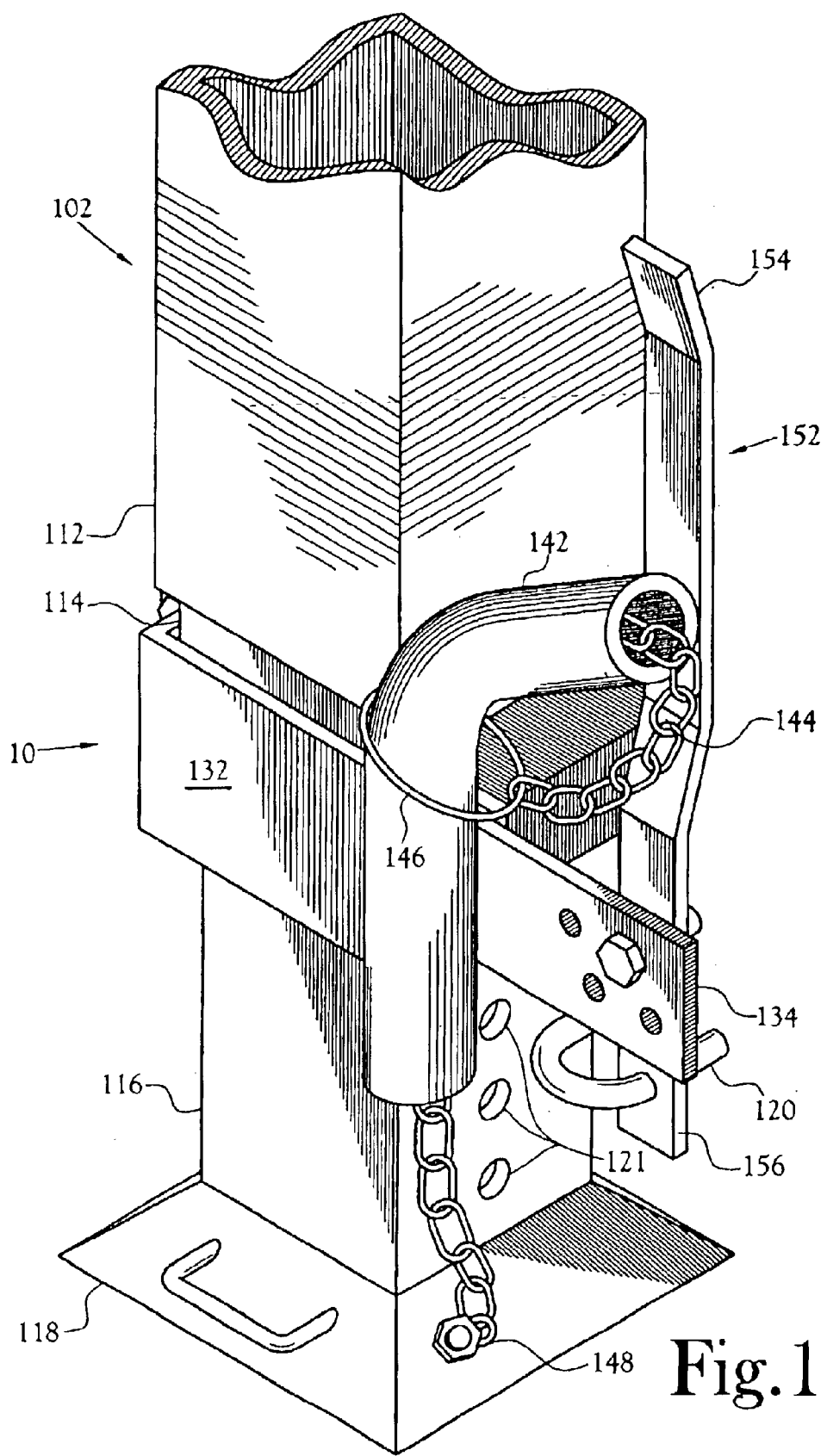
FIG. 1 is a perspective view of a jack assistance apparatus mounted on the lower end of a trailer jack.

FIG. 1 illustrates the lower portion of a trailer jack 102 with a jack assistance apparatus 10 mounted thereon. The illustrated jack 102 has telescoping tubes with a foot 118 attached to the innermost tube 116. The telescoping tube 114 that surrounds the innermost tube 116 and is inside the outermost tube 112 has a spring loaded pin 120 that engages one of a series of openings 121 in the innermost tube 116, thereby fixing the innermost tube 116 to the middle telescoping tube 114. With the two smaller tubes 114, 116 held in a fixed position, the jacking mechanism causes the two inner tubes 114, 116 to extend or retract in relation to the outermost tube 112, thereby lifting or lowering the trailer.

Figure 6:
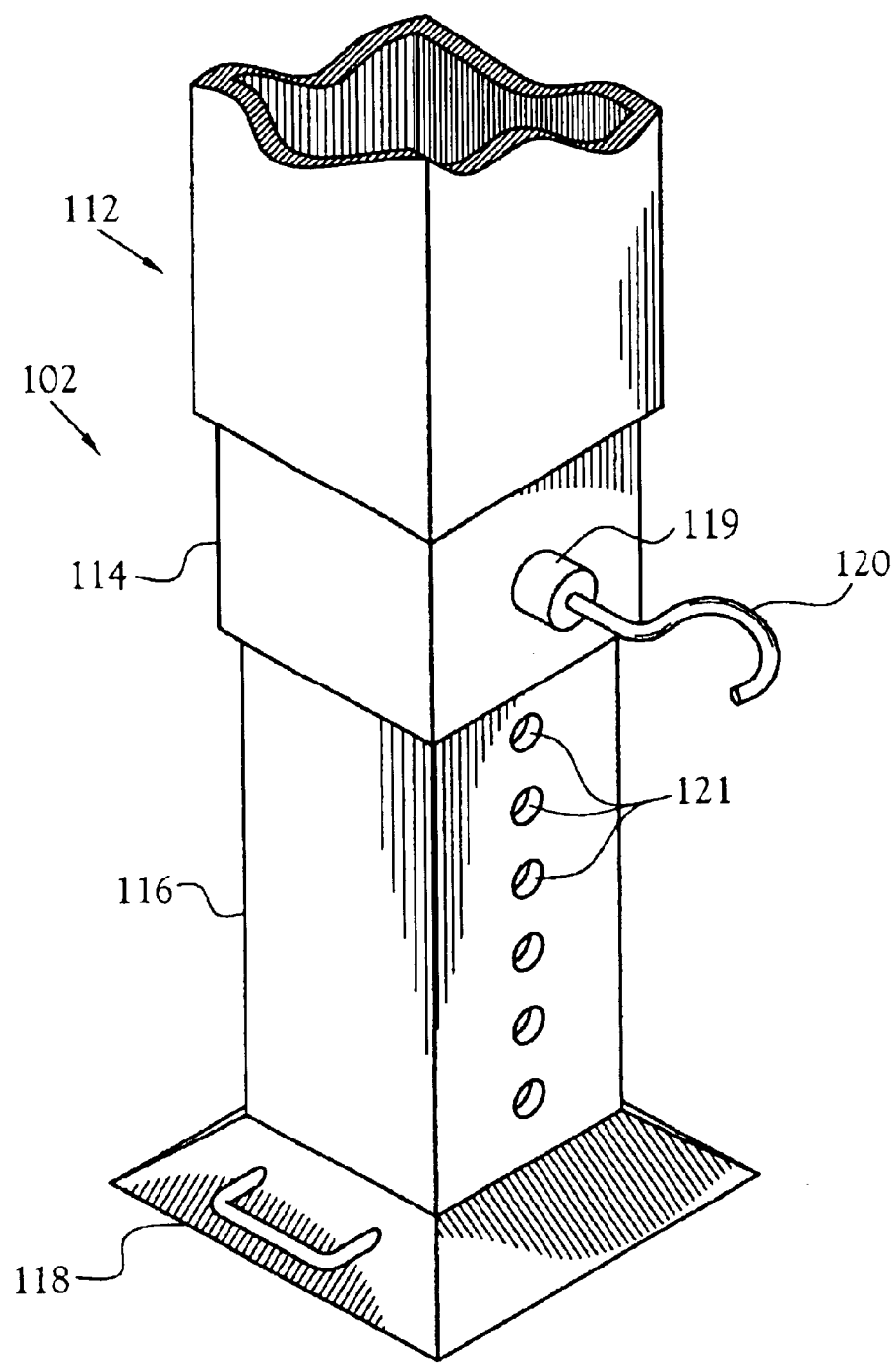
FIG. 6 is a perspective view of a prior art jack.

FIG. 6 illustrates one example of a prior art trailer jack 102. The jack 102 has an upper tube 112 and a middle tube 114 that telescopes relative to upper tube 112. For illustration purposes, the innermost tube 116 is called the first tube member 116 and the middle tube 114 is called the second tube member 114. The second tube member 114 is typically controlled by a screw (not illustrated). Inside the second tube member 114 is a second tube member 114, which telescopes relative to the upper tube 112. A jack pin 120 is part of a spring loaded pin assembly 119 attached to the second tube member 114. The jack pin 120 typically has a hook shaped handle for grasping by an operator, and the pin 120 is spring loaded to return to a position in which the pin 120 engages an opening in the second tube member 114 (not illustrated because it is hidden by the spring loaded pin assembly 119) and one of the openings 121 in the first tube member 116, thereby securing the first tube member 116 to the second tube member 114. A typical operation of the prior art trailer jack 102 includes a coarse vertical adjustment by pulling the jack pin 120 out, thereby disengaging the jack pin 120 from a hole 121 in the first tube member 116. The first tube member 116 falls with the foot 118 resting on the ground. The foot 118 is lifted until a hole 121 in the first tube member 116 is engaged by the jack pin 120. The second tube member 114 is then telescoped to extend the second tube member 114 from the outermost tube 112 until the foot 118 contacts the ground and the trailer is lifted to the desired height.

A clamping member 132 is attached to the middle telescoping tube 114 of the jack 102. The clamping member 132 has a connection bracket 134 extending adjacent to the jack pin 120. A lever arm 152 is pivotably connected to the connection bracket 134 and the lower end 156 of the lever arm 152 engages the jack pin 120 such that movement of the handle end 156 of the lever arm 152 causes the jack pin 120 to move laterally, causing the pin 120 to be either inserted or removed. A guide tube 142 is attached to the clamping member 132. Running through the guide tube 142 is a chain 144 or other flexible member that is connected at one end to the jack foot 118 and the other end runs free with a grasping ring 146. The end of the chain 144 connected to the jack foot 118 is secured to the jack foot 118 with a bolt and nut assembly 148, a cleat, a repair link, or other fastening means. The grasping ring 146 is larger in diameter than the inside diameter of the guide tube 142, and the ring 146 prevents the chain 144 from falling through the guide tube 142. In the illustrated embodiment, the grasping ring 146 has an inside diameter larger than the outside diameter of the guide tube 142, and the ring 146 can be placed over the upper end of the guide tube 142 for storage and to keep the free end of the chain 144 from swinging.

In use, when the jack 102 is in the stowed position, that is, with the telescoping tubes 114, 116 collapsed or retracted inside the outermost tube 112, the lever arm handle 154 is pushed toward the jack 102, causing the jack pin 120 to be retracted and the innermost telescoping tube 116 to fall towards the ground. To return the jack 102 to the stowed position, the chain 144 is pulled while the lever arm handle 154 is pushed toward the jack 102. The chain 144 pulls the jack foot 118 to move upwards and the inner telescoping tube 116 to move inside the middle telescoping tube 114. When the inner telescoping tube 116 reaches the desired retracted position, the lever arm 154 is released, causing the jack pin 120 to return to its normal position and pinning the inner telescoping tube 116 to the middle telescoping tube 114.

The lever arm 152 and the upper end of the guide tube 142 are at a height that is more convenient for the operator of the jack 102 and does not require the operator to bend over and grasp the jack foot 118, which is resting on the ground, while pulling the jack pin 120 to disengage the inner tube 116. The grasping ring 146 and the lever arm handle 154, in one embodiment, are positioned at waist height for an average operator, which reduces the chance of a back injury from bending and lifting the jack foot 118 improperly.

Figure 2:
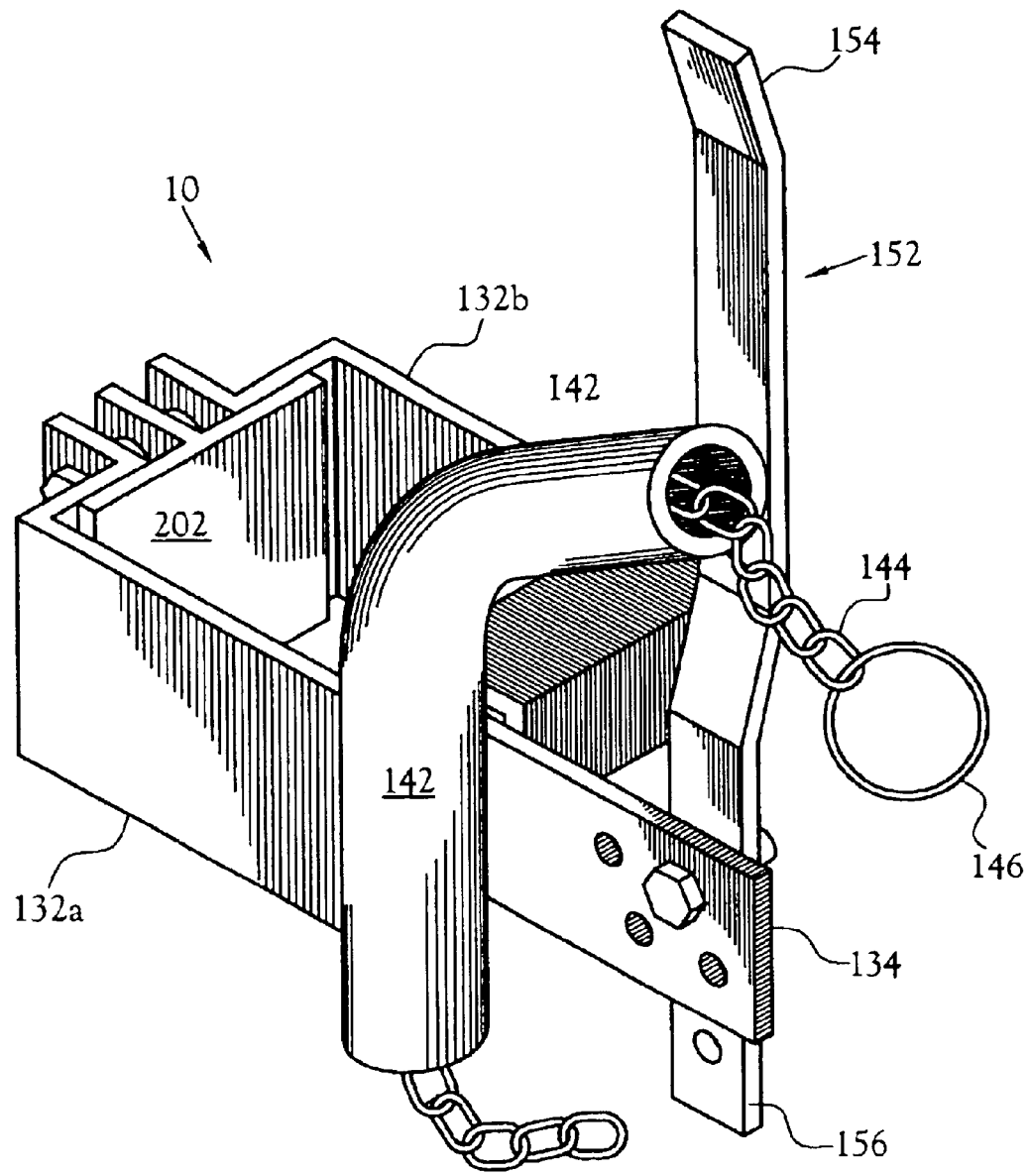
FIG. 2 is a perspective view of the jack assistance apparatus.
Figure 3:
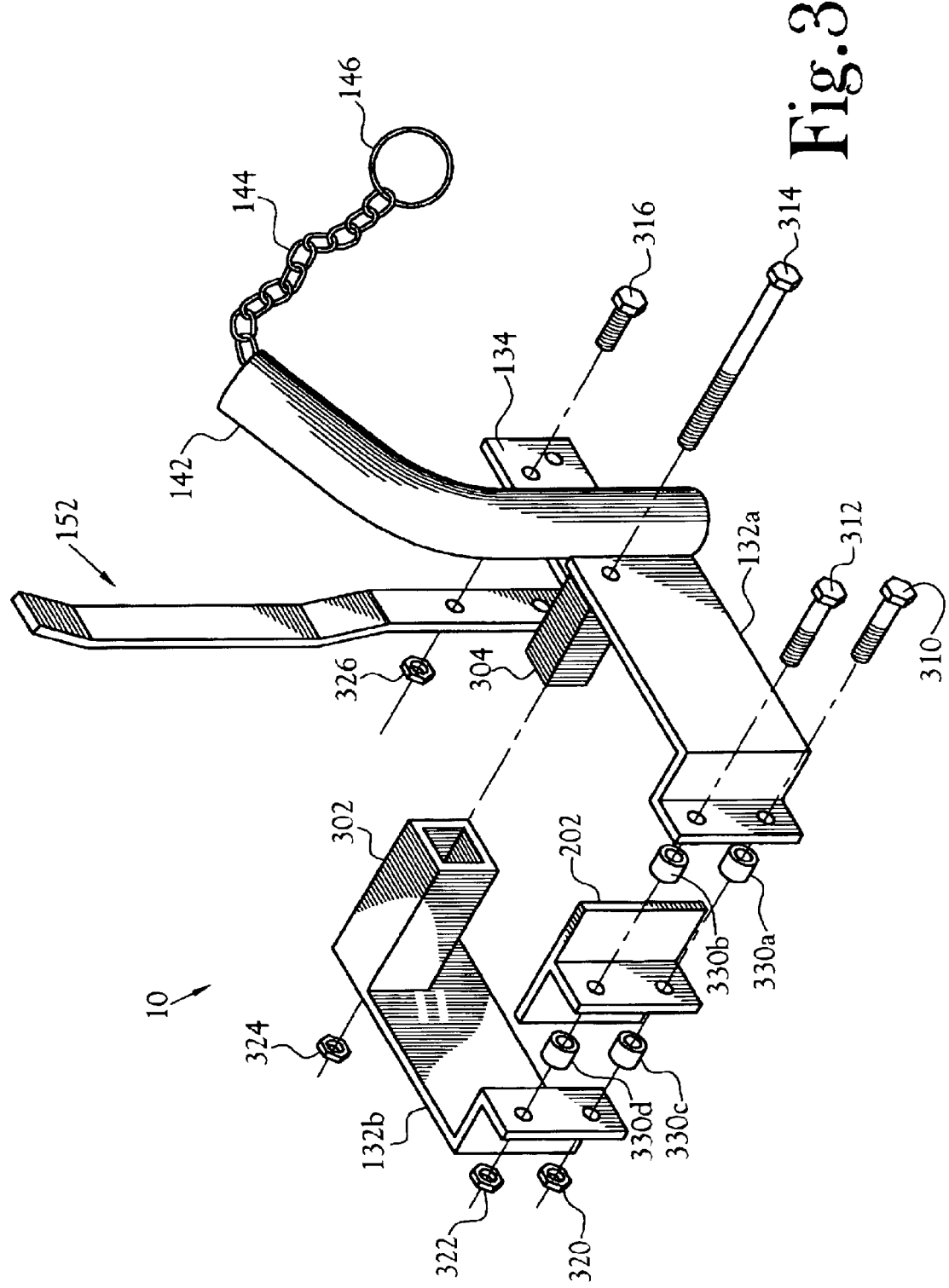
FIG. 3 is an exploded diagram showing the jack assistance apparatus.

FIG. 2 illustrates the jack assistance apparatus 10 as an assembled unit. FIG. 3 is an exploded view of the jack assistance apparatus 10. The clamping member 132 includes two members 132a, 132b, which are fastened together by bolts 310, 312, 314 and corresponding nuts 320, 322, 324. The clamping member 132 also includes an outer tube member 302 and an inner tube member 304, through which a bolt 316 passes. Also illustrated is an optional spacer assembly that includes a spacer bracket 202 and spacers 330.

The clamping member 132 is attached to the jack 102 by sliding the inner tube member 304 into the outer tube member 302 and using the bolts 310, 312, 314 and nuts 320, 322, 324 to secure the clamping member 132 to the jack 102. The illustrated embodiment has a clamping member 132 sized to clamp onto a standard jack 102 with a four inch square tube. For jacks 102 that have a smaller tube size, for example, one with a three and one-half inch tube, the inner tube member 304 slides further into the outer tube member 302 and the spacer bracket 202 is used to fill the air gap formed between the jack tube 114 and the clamping member 132. The spacers 330 are optionally used to center the spacer bracket 202 in the clamping member 132.

After the clamping member 132 is attached to the jack 102, the lever arm 152 is attached to the jack pin 120 by sliding the lever arm 152 such that an opening in the lower end 156 of the arm 152 engages the jack pin 120. The lever arm 152 is attached to the connection bracket 134 by aligning an opening in the lever arm 152 with a corresponding opening in the connection bracket 134 and inserting a bolt 316 through the aligned openings. The bolt 316 is secured by a nut 326, which can be a self-locking nut that is not tightened on the bolt 316 such that the lever arm 152 can pivot around the bolt 316.

The guide tube 142 is attached to the clamping member 132 and extends above the clamping member 132. The chain 144 is run through the guide tube 142, and the chain 144 has a gripping ring, or handle, 146 at the end of the chain 144 extending above the clamping member 132. The lower end of the chain 144 is attached to the jack foot 118 (illustrated in FIG. 1). Those skilled in the art will recognize that the chain 144 can be attached to the jack foot 118 with either a bolt and nut assembly 148, a cleat, a repair link, or other fastening means without departing from the scope and spirit of the present invention.

Figure 4:
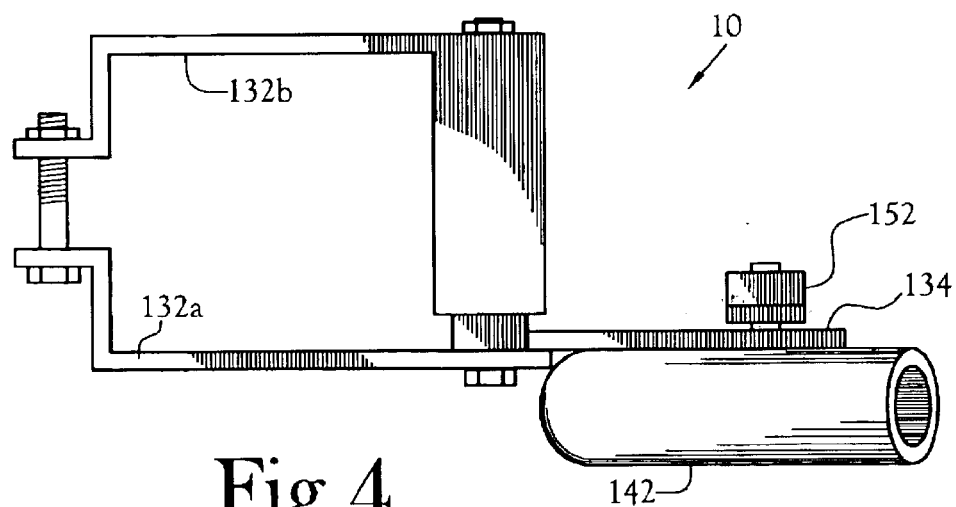
FIG. 4 is a top view of the apparatus.

FIG. 4 is a top view of another embodiment of the jack assistance apparatus 10. In this embodiment, the clamping member 132 is set up as it would be if it were attached to a standard jack 102 with a four inch square tube. As can be seen, the spacer bracket 202 is not used in this embodiment.

Figure 5:
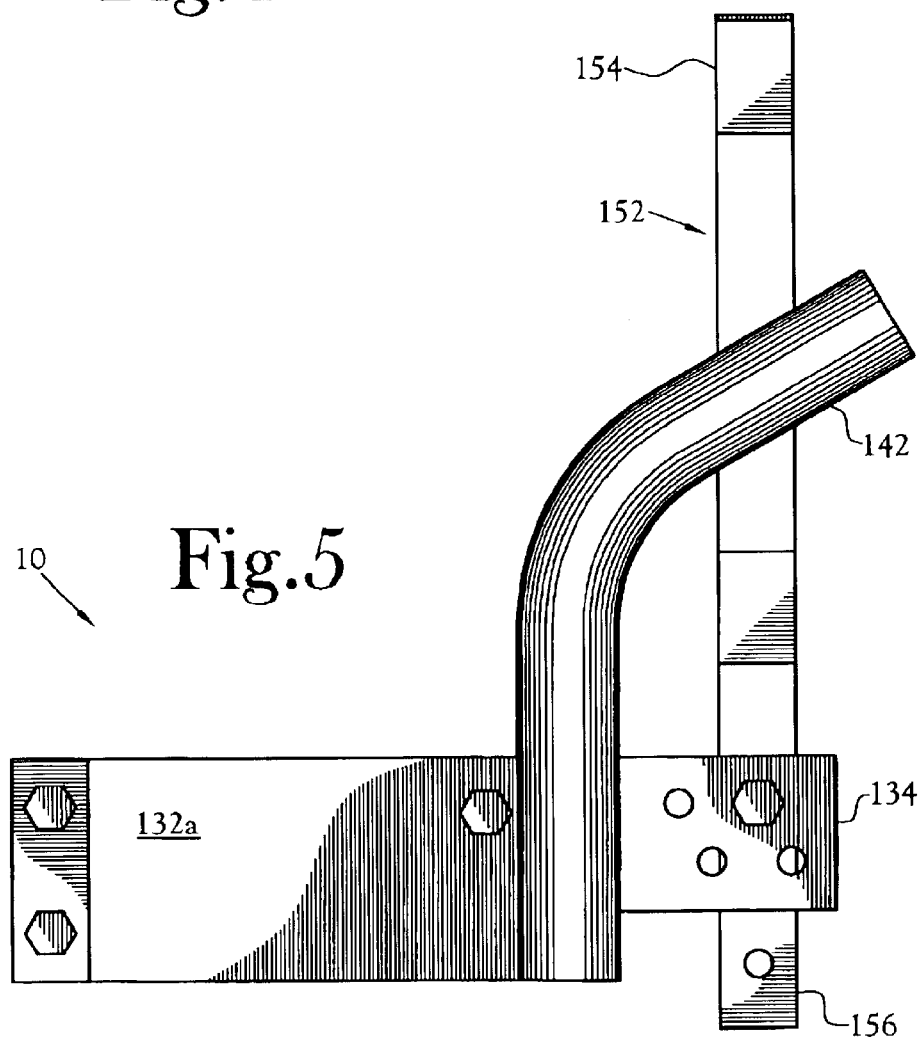
FIG. 5 is a side view of the apparatus.

FIG. 5 is a side view of the jack assistance apparatus 10. This figure illustrates the relationship of the lever arm 152 to the connection bracket 134. The lever arm 152 has an opening at its lower end 156 that engages the jack pin 120. The lever arm 152 has another opening that aligns with one of the openings in the connection bracket 134. The bolt 316 is inserted through the aligned holes and, with nut 326, loosely fastens the lever arm 152 to the connection bracket 134 such that the lever arm 152 pivots about the bolt 316. Those skilled in the art will recognize that one or more openings in the connection arm 134 can be used, depending upon the range of adjustment desired, without departing from the spirit and scope of the present invention.

From the foregoing description, it will be recognized by those skilled in the art that a jack assistance apparatus has been provided. The apparatus includes a clamping member that attaches the apparatus to a standard jack, a guide tube and chain for lifting the jack foot, and a lever arm for operating the jack pin.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus, and illustrative examples shown and described. Accordingly, departures may be made from such details without departing from the spirit or scope of applicant's general inventive concept.

What is claimed is:

1. An apparatus for assisting in the coarse vertical adjustment of a jack, said jack including first and second tube members telescopically mounted relative to one another, the first tube member having a jack foot attached to a distal end and selectively engaging a supporting surface, the first tube member having a plurality of apertures spaced apart along the length of the first tube member and adapted for movement of one of the apertures of the first tube member into register with an aperture of the second tube member, and a jack pin adapted to engage and disengage with registered apertures of the first and second tube members, said apparatus comprising:

a connecting arm mounted to the second tube member; and a lever arm pivotably connected to said connecting arm and having a distal end adapted to engage the jack pin for movement of the jack pin between engagement and disengagement with registered ones of the apertures of the first and second tube members.

2. The apparatus of claim 1 further comprising a guide tube attached to the second tube member; and a flexible member routed through said guide tube, said flexible member having a grasping end and a connecting end attached to the jack foot, wherein a pulling force applied to said grasping end causes the jack foot to raise from the supporting surface when the jack pin is disengaged.

3. The apparatus of claim 1 wherein said connecting arm is attached to the second tube by a clamping member.

4. The apparatus of claim 3 wherein said clamping member includes a first half and a second half, said first half having a first connecting member, said second half having a second connecting member coaxially oriented to and slidably engaging said first connecting member, said first half having a first aperture coaxially aligned with a corresponding second aperture, said first aperture and said second aperture receiving a fastener, wherein said fastener secures said first half and said second half to the second tube member.

5. The apparatus of claim 3 wherein said clamping member includes a spacer adapted to fit between said clamping bracket and the second tube member.

6. An apparatus for assisting in the coarse vertical adjustment of a jack, said jack including first and second tube members telescopically mounted relative to one another, the first tube member having a jack foot attached to a distal end and selectively engaging a supporting surface, the first tube member having a plurality of apertures spaced apart along the length of the first tube member and adapted for movement of one of the apertures of the first tube member into register with an aperture of the second tube member, and a jack pin adapted to engage and disengage with registered apertures of the first and second tube members, said apparatus comprising:

a guide tube attached to the second tube member; and a flexible member routed through said guide tube, said flexible member having a connecting end and a grasping end, said connecting end attached to the jack foot, wherein a pulling force applied to said grasping end causes the jack foot to raise from the supporting surface when the jack pin is disengaged.

7. An apparatus for assisting in the coarse vertical adjustment of a jack, said jack including first and second tube members telescopically mounted relative to one another, the first tube member having a jack foot attached to a distal end and selectively engaging a supporting surface, the first tube member having a plurality of apertures spaced apart along the length of the first tube member and adapted for movement of one of the apertures of the first tube member into register with an aperture of the second tube member, and a jack pin adapted to engage and disengage with registered apertures of the first and second tube members, said apparatus comprising:

a clamping member for attaching to the second tube;

a connecting arm attached to said clamping member;

a lever arm pivotably connected to said connecting arm and having a distal end adapted to engage the jack pin for movement of the jack pin between engagement and disengagement with registered ones of the apertures of the first and second tube members;

a guide tube attached to the second tube; and a flexible member routed through said guide tube, said flexible member having a grasping end and a connecting end attached to the jack foot, wherein a pulling force applied to said grasping end causes the jack foot to raise from the supporting surface when the jack pin is disengaged.

8. The apparatus of claim 7 wherein said clamping member includes a spacer adapted to fit between said clamping bracket and the second tube.

9. The apparatus of claim 7 wherein said clamping member includes a first half and a second half, said first half having a first connecting member, said second half having a second connecting member coaxially oriented to and slidably engaging said first connecting member, said first half having a first aperture coaxially aligned with a corresponding second aperture, said first aperture and said second aperture receiving a fastener, wherein said fastener secures said first half and said second half to the second tube member.

10. The apparatus of claim 9 wherein said clamping member includes a spacer having a spacer aperture that is coaxially aligned with and between said first aperture and said second aperture, said spacer aperture receives said fastener, said second tube member having a first side and an opposite second side, said spacer adapted to bear against said first side when one of said first connecting member and said second connecting member bears against said second side.

11. An apparatus for assisting in the coarse vertical adjustment of a jack, said jack including first and second tube members telescopically mounted relative to one another, the first tube member having a jack foot attached to a distal end and selectively engaging a supporting surface, the first tube member having a plurality of apertures spaced apart along the length of the first tube member and adapted for movement of one of the apertures of the first tube member into register with an aperture of the second tube member, and a jack pin adapted to engage and disengage with registered apertures of the first and second tube members, said apparatus comprising:

a means for operating the jack pin at a first elevation, which is higher than a second elevation measured at the jack pin.

12. The apparatus of claim 11 further comprising a means for lifting the jack foot by applying a force at a third elevation, which is higher than a second elevation measured at the jack pin.

13. An apparatus for assisting in the coarse vertical adjustment of a jack, said jack including first and second tube members telescopically mounted relative to one another, the first tube member having a jack foot attached to a distal end and selectively engaging a supporting surface, the first tube member having a plurality of apertures spaced apart along the length of the first tube member and adapted for movement of one of the apertures of the first tube member into register with an aperture of the second tube member, and a jack pin adapted to engage and disengage with registered apertures of the first and second tube members, said apparatus comprising:

a means for lifting the jack foot by applying a force at a third elevation, which is higher than a second elevation measured at the jack pin.

14. The apparatus of claim 13 further comprising a means for a means for operating the jack pin at a first elevation, which is higher than a second elevation measured at the jack pin.

\* \* \* \* \*